(12) United States Patent
Hennebelle et al.

(10) Patent No.: US 10,598,229 B2
(45) Date of Patent: Mar. 24, 2020

(54) TORQUE TRANSMISSION DEVICE FOR A MOTOR VEHICLE

(71) Applicant: VALEO EMBRAYAGES, Amiens (FR)

(72) Inventors: Michael Hennebelle, Houdain (FR); Roel Verhoog, Gournay sur Aronde (FR)

(73) Assignee: Valeo Embrayages, Amiens (FR)

( * ) Notice: Subject to any disclaimer, the term of this patent is extended or adjusted under 35 U.S.C. 154(b) by 198 days.

(21) Appl. No.: 15/593,096

(22) Filed: May 11, 2017

(65) Prior Publication Data

US 2017/0328415 A1 Nov. 16, 2017

(30) Foreign Application Priority Data

May 12, 2016 (FR) .................................... 16 54271

(51) Int. Cl.
*F16F 15/123* (2006.01)
*F16D 3/12* (2006.01)
*F16F 15/14* (2006.01)
*F16F 1/06* (2006.01)
(Continued)

(52) U.S. Cl.
CPC ................. *F16D 3/12* (2013.01); *F16F 1/06* (2013.01); *F16F 15/12306* (2013.01); *F16F 15/12353* (2013.01); *F16F 15/12366* (2013.01); *F16F 15/145* (2013.01); *F16D 13/38* (2013.01); *F16D 2300/22* (2013.01); *F16F 15/1217* (2013.01)

(58) Field of Classification Search
CPC ........ F16D 3/12; F16D 2300/22; F16D 13/38; F16F 15/12353; F16F 1/06; F16F 15/12306; F16F 15/145; F16F 15/12366; F16F 15/1217

USPC ..................... 464/68.2, 68.7, 68.8; 192/201, 192/213.1–213.22
See application file for complete search history.

(56) References Cited

U.S. PATENT DOCUMENTS 3,101,600 A * 8/1963 Stromberg ........ F16F 15/12366
192/213.2
6,224,487 B1 * 5/2001 Yuergens .......... F16F 15/12366
464/68.8
(Continued)

FOREIGN PATENT DOCUMENTS

| DE | 112014000286 T5 | 8/2015 |
| EP | 2053273 A1 | 4/2009 |
| WO | WO2015129885 A1 | 9/2015 |

*Primary Examiner* — Greg Binda
(74) *Attorney, Agent, or Firm* — Berenato & White, LLC

(57) ABSTRACT

A torque transmission device for a motor vehicle includes a torque input element for coupling to a driving shaft, a torque output element for coupling to an input shaft of a gearbox, the torque output element and the torque input element pivotable with respect to one another, and first and second elastic damping stages installed in series between the torque input element and torque output element. The first damping stage has an elastic member installed between the torque input element and a guidance device so as to act against the rotation of the guidance device with respect to the torque input element. The second damping stage has at least one elastic member installed between the guidance device and the torque output element so as to act against the rotation of the torque output element with respect to the guidance device. The guidance device has first and second stop means.

18 Claims, 9 Drawing Sheets

(51) Int. Cl.
*F16F 15/121* (2006.01)
*F16D 13/38* (2006.01)

(56) References Cited

U.S. PATENT DOCUMENTS

2015/0337934 A1 11/2015 Takikawa et al.
2016/0356340 A1 12/2016 Ito et al.

* cited by examiner

TORQUE TRANSMISSION DEVICE FOR A MOTOR VEHICLE

CROSS-REFERENCE TO RELATED APPLICATIONS AND CLAIM TO PRIORITY

This application is related to patent application Ser. No. 1654271 filed May 12, 2016 in France, the disclosure of which is incorporated herein by reference and to which priority is claimed.

FIELD OF THE INVENTION

The present invention relates to a torque transmission device for a motor vehicle.

BACKGROUND OF THE INVENTION

A torque transmission device for a motor vehicle conventionally has a torque input element intended to be coupled to a driving shaft; a torque output element intended to be coupled to an input shaft of a gearbox, the torque output element and the torque input element being capable of pivoting with respect to one another around an axis; and first and second elastic damping stages installed in series between the torque input element and torque output element.

Each damping stage is conventionally equipped with two guide washers situated axially on either side of elastic members of said damping stage, the forces in particular passing through said guide washers.

A combustion engine generates irregularities due to the successive combustion events in the cylinders of the engine, those irregularities varying in particular as a function of the number of cylinders.

The different damping stages in particular allow such irregularities to be damped.

SUMMARY OF THE INVENTION

The object of the invention is to supply a simple, effective, and economical alternative to the torque transmission devices of the existing art.

For that purpose it proposes a torque transmission device for a motor vehicle, having: a torque input element intended to be coupled to a driving shaft; a torque output element intended to be coupled to an input shaft of a gearbox, the torque output element and the torque input element being capable of pivoting with respect to one another around an axis X; and first and second elastic damping stages installed in series between the torque input element and torque output element, wherein the first damping stage has at least one elastic member installed between the torque input element and a guidance device so as to act against the rotation of said guidance device with respect to the torque input element, the second damping stage having at least one elastic member installed between the guidance device and the torque output element so as to act against the rotation of the torque output element with respect to said guidance device, the guidance device having first stop means capable of limiting the pivoting of the torque input element with respect to the guidance device, and second stop means capable of limiting the pivoting of the torque output element with respect to the guidance device.

When the elastic members of the damping stages are, for example, helical springs, it is often preferable to prevent the turns of said springs from being contiguous during operation of the device, in order to prevent any degradation of the performance of said springs. Limiting the angular deflection with the aid of stop means makes it possible, in particular, to prevent such a phenomenon.

The first and second stop means can be arranged radially inside the elastic member of the second damping stage.

The first stop means are capable of acting bidirectionally between the torque input element and the guidance device, in order to limit the pivoting of the torque input element with respect to the guidance device in both relative rotation directions.

The second stop means are capable of acting bidirectionally between the torque output element and the guidance device so as to limit the pivoting of the torque output element with respect to the guidance device in both relative rotation directions.

Second stop means can be capable of limiting the pivoting of the torque output element with respect to the guidance device.

The first and second stop means can be arranged radially inside the elastic member of the second damping stage, and radially inside the elastic member of the first damping stage. The physical size of the guidance device and of the damper is thus decreased.

The guidance device can have a plurality of guide washers disposed axially on either side of the elastic members of the first and second damping stages, in order to axially guide said elastic members of the two damping stages.

According to an embodiment, the guidance device has a guide washer common to the two damping stages, the elastic member of the first damping stage being installed between the torque input element and the common guide washer, and the elastic member of the second damping stage being installed between the common guide washer and the torque output element. The use of a common guide washer allows the number of guide washers of the device, and thus also the weight and size of such a device, to be reduced.

According to an embodiment, the elastic member of the first damping stage and the elastic member of the second damping stage can be situated axially on either side of said common guide washer.

The guide washer can have first and second lateral guide washers fastened to the common guide washer and situated axially on either side of the common guide washer, the elastic member of the first damping stage being situated axially between the common guide washer and the first lateral guide washer, the elastic member of the second damping stage being situated axially between the common guide washer and the second lateral guide washer.

The elastic member of the first damping stage is capable of abutting against the first lateral guide washer and against the common guide washer in order to transmit a torque between the torque input element and the guidance device, and the elastic member of the second damping stage is capable of abutting against the second lateral guide washer and against the common guide washer in order to transmit a torque between the guidance device and the torque output element.

The first stop means and the second stop means can be arranged on the common guide washer.

The angular deflection of the torque input element with respect to the guidance device and/or the angular deflection of the torque output element with respect to the guidance device can be between 15 and 45°, for example on the order of 30°.

The guidance device can have at least one stop member forming both a first stop means and a second stop means.

The stop member can be formed on the common guide washer.

In particular, the common guide washer can extend radially.

The stop member is formed by a tab, the torque input element and the torque output element being capable of abutting in two zones of said tab which are offset from one another.

The elastic member of the first damping stage can be offset axially and radially from the elastic member of the second damping stage.

In particular, the elastic member of the first damping stage can be situated radially externally with respect to the elastic member of the second damping stage.

The device can have pendulum damping means comprising pendulum masses installed movably on the guidance device and/or on a support fastened to the guidance device.

Pendulum damping means of this kind allow improved filtering of rotational irregularities. The pendulum masses are preferably installed on an element having considerable inertia, in this case the guidance device that comprises the guide washer or washers and/or the assemblage that comprises the support and the guidance device.

The guidance device and, if applicable, the pendulum mass support together have an inertia of between 0.005 kg·m² and 0.05 kg·m², for example 0.03 kg·m².

The pendulum masses can be installed movably on a support fastened to the second lateral guide washer.

The first elastic damping stage can have at least two elastic members arranged in series by means of a phasing member.

The torque damping device can also have at least one of the following characteristics:

- The torque input element has an input web situated axially between the common guide washer and the first lateral guide washer.
- The torque output element has an output web situated axially between the common guide washer and the second lateral guide washer.
- The torque input element has an input hub comprising an annular portion that extends radially and is fastened to the input web, and an annular portion that extends axially and has splines.
- The torque output element has an output hub fastened to the output web.
- The phasing member has at least two phase washers situated axially on either side of the input web.
- The elastic members of the first damping stage and/or of the second damping stage are curved compression springs and/or straight compression springs.
- The guidance device comprises a flange installed pivotingly around the output hub, more specifically around a cylindrical portion of the output hub.
- According to an embodiment, the flange is fastened to the second lateral guide washer.
- The output web is fastened to, and at its radially inner periphery comes into abutment against, a radial surface of the output hub.
- The radially inner periphery of the output web is inserted axially between the flange and said radial surface of the output hub.
- The input web has at least one opening extending circumferentially.
- The torque input element and the torque output element are capable of abutting respectively at the base of said tab and at the free end of said tab, or vice versa.
- The torque input web has at least one opening extending circumferentially, the stop member being engaged into said opening and being capable of abutting against the circumferential ends of said opening so as to limit the angular deflection of the input web with respect to the guidance device.
- The free end of the stop tab is capable of abutting against the circumferential ends of said opening of the input web so as to limit the angular deflection of the input web with respect to the guidance device.
- The torque output web has at least one stop tab extending radially and having two opposite lateral surfaces capable of abutting against two stop members of the guidance device offset circumferentially from one another so as to limit the angular deflection of the output web with respect to the guidance device.
- Each stop tab is connected to the remainder of the common guide washer by a curved zone that is folded over at the base of the tab, the lateral surfaces of the stop tabs of the output web being capable of abutting against the stop tabs of the guidance device at said curved zone.
- The first and second lateral guide washers are fastened to the common guide washer by welding and/or riveting or by hot crimping.
- The first and second lateral guide washers are fastened at their outer peripheries to the common guide washer.
- The input web has a radially inner portion and a radially outer portion that are axially offset from one another, the elastic member of the first damping stage being capable of abutting against the radially outer part of the input web.
- The input web is installed pivotingly around the output hub, in particular around a cylindrical portion of the output hub.
- The common guide washer is installed pivotingly around the output hub, in particular around a cylindrical portion of the output hub.

The guidance device can thus be installed pivotingly around the output hub in two axially offset zones. This also imparts great stability to the guidance device, which is especially useful when pendulum masses are installed, optionally via a support, on the guidance device.

- The guidance device has two guide washers centered on an output hub, for example by means of a flange, one of those guidance washers exhibiting a slot and the other guide washer exhibiting a tongue introduced into the slot, and those two guide washers being fastened to one another by a hot crimping operation of said tongue. The guidance device is thus stable and easy to install, a slight radial clearance being capable of being left between the slot and the tongue before the crimping operation, and that clearance being at least partly taken up after the crimping operation.
- The total inertia of the damper (with turbine, if there is a turbine) is between 0.01 kg·m² and 0.06 kg·m², in particular between 0.02 kg·m² and 0.05 kg·m².
- The elastic members of the first and second damping stages are helical springs; the sectional diameter of the elastic member of the second damping stage is greater than the sectional diameter of the elastic member of the first damping stage.
- The elastic member of the second damping stage has a stiffness constant which is greater than the stiffness constant of the elastic member of the first damping stage.

According to another embodiment, the elastic member of the first damping stage and the elastic member of the second damping stage can be situated axially on the same side of said common guide washer.

The guidance device can have first and second additional guide washers fastened to the common guide washer and situated axially on the same side of the common guide washer, the elastic member of the first damping stage being situated axially between the common guide washer and the first additional guide washer, the elastic member of the second damping stage being situated axially between the common guide washer and the second additional guide washer.

The elastic member of the first damping stage is capable of abutting against the first additional guide washer and against the common guide washer in order to transmit a torque between the torque input element and the guidance device, and the elastic member of the second damping stage is capable of abutting against the second additional guide washer and against the common guide washer in order to transmit a torque between the guidance device and the torque output element.

According to this embodiment, the first and second stop means are carried by the second additional guide washer.

The guidance device can have at least one stop member forming both the first stop means and the second stop means.

The stop member can be formed on the second additional guide washer.

The aforementioned characteristics relative to the stop member in the context of the first embodiment, considered alone or in combination, can be applied to this second embodiment.

The device can have pendulum damping means comprising pendulum masses installed movably on the guidance device and/or on a support fastened to the guidance device.

The pendulum masses can be installed movably on a support fastened to the common guidance washer.

Alternatively, the invention can relate to a torque transmission device for a motor vehicle, having: a torque input element intended to be coupled to a driving shaft; a torque output element intended to be coupled to an input shaft of a gearbox, the torque output element and the torque input element being capable of pivoting with respect to one another around an axis X; and first and second elastic damping stages installed in series between the torque input element and the torque output element, wherein the first damping stage has at least one elastic member installed between the torque input element and a guide washer common to the two stages so as to act against the rotation of said guide washer with respect to the torque input element, the second damping stage having at least one elastic member installed between said common guide washer and the torque output element so as to act against the rotation of the torque output element with respect to said common guide washer.

Alternatively, the invention can relate to a torque transmission device for a motor vehicle, having: a torque input element intended to be coupled to a driving shaft; a torque output element intended to be coupled to an input shaft of a gearbox, the torque output element and the torque input element being capable of pivoting with respect to one another around an axis X; and first and second elastic damping stages installed in series between the torque input element and the torque output element, wherein the first damping stage has at least one elastic member installed between the torque input element and a guidance device so as to act against the rotation of said guidance device with respect to the torque input element, the second damping stage having at least one elastic member installed between said guidance device and the torque output element so as to act against the rotation of the torque output element with respect to said guidance device; and wherein the torque output element has an output hub, and the guidance device has two centering regions interacting with said output hub.

The guidance device is thus particularly stable.

These two centering regions can be axially offset from one another.

The torque output element can have an output web, the output hub being rotationally driven by the output web, and the two centering regions of the guidance device being arranged axially on either side of the output web.

The output hub can have a radial extension arranged axially between the two centering portions in such a way that that radial extension is capable of retaining the two centering regions axially in both directions. The guidance device and the output hub can thus be held axially with respect to one another even in the context of a large axial load.

The guidance device has an assemblage of guide washers that axially guide the elastic members of the two damping stages, and the guidance device furthermore having a flange, for example, fastened to one of the guide washers, and on which a first centering region is arranged.

The flange can be arranged radially inside the elastic member of the second damping stage.

The elastic member of the second damping stage can be guided axially by two guide washers arranged axially on either side of the elastic member of the second damping stage, one of those two guide washers being centered on the output hub by means of the flange, and the second guide washer also being centered on the output hub.

The second centering region is carried by that second guide washer, the centering region being in particular a central bore formed in that second guide washer.

BRIEF DESCRIPTION OF THE DRAWINGS

The invention will be better understood, and other details, characteristics, and advantages of the invention will emerge, upon reading the description below provided as a non-limiting example referring to the attached drawings, in which:

FIGS. 1 and 2 are section views of the device;

FIG. 3 is an exploded view in perspective illustrating the common guide washer, the input web, and the output web of the device;

FIG. 4 is a perspective view of the device;

FIGS. 5 and 6 are perspective views of the common guide washer.

FIG. 7 is a section view of the device;

FIGS. 8 and 9 are exploded perspective views of the device.

DETAILED DESCRIPTION OF THE PREFERRED EMBODIMENT(S)

Figure 1:
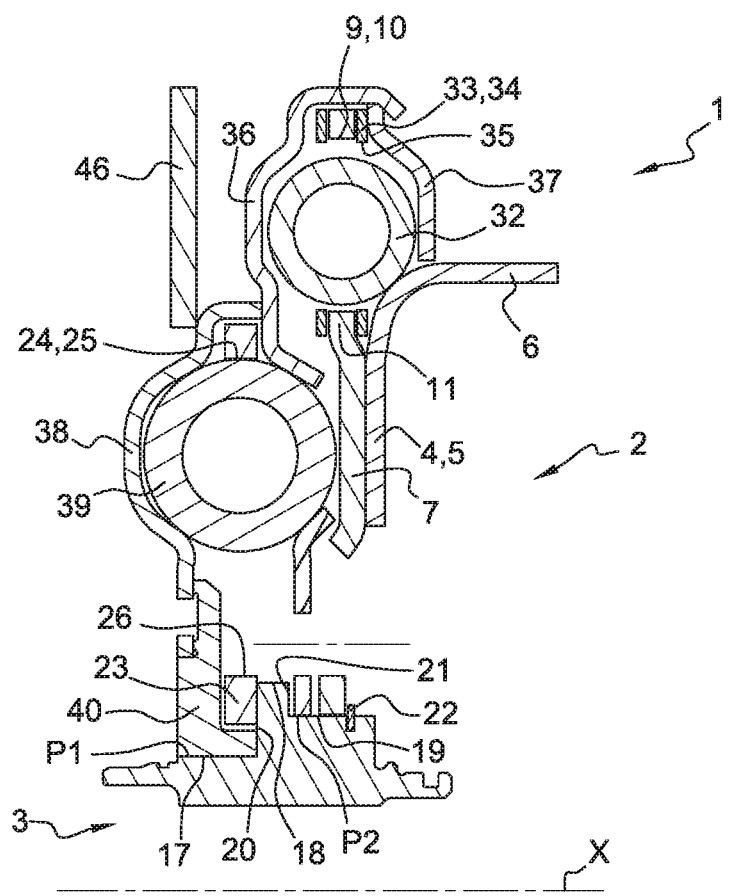
FIGS. 1 to 6 illustrate a torque transmission device according to a first embodiment of the invention; specifically.
Figure 1:
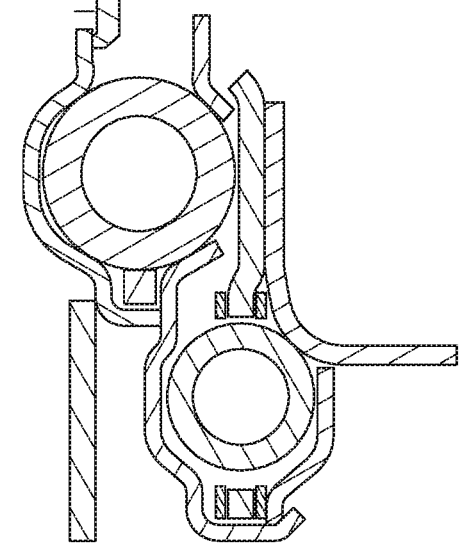

FIGS. 1 to 6 illustrate a torque transmission device 1 according to a first embodiment of the invention. It extends along an axis X and has a torque input element 2 and a torque output element 3 between which damping means are arranged.

The terms "axial," "radial," and "circumferential" are defined with reference to axis X.

Torque input element 2 has an input hub 4 comprising a radially extending annular portion 5, the radially outer periphery of which is prolonged by a cylindrical splined annular portion 6 intended to carry a friction disc of a clutch which allows transmission, in a determined operating phase, of a torque proceeding from the crankshaft of the engine, as is known per se.

Torque input element 2 furthermore has an annular input web 7, which extends radially and whose radially inner portion is fastened to radial portion 5 of hub 4, for example by welding or by riveting 8.

Annular input web 7 has windows 9 of circular-arc shape, for example three in number, distributed evenly over the circumference. Each window 9 has a radially outer edge 10 and a radially inner edge 11 extending circumferentially, connected by lateral edges 12 extending radially.

Figure 3:
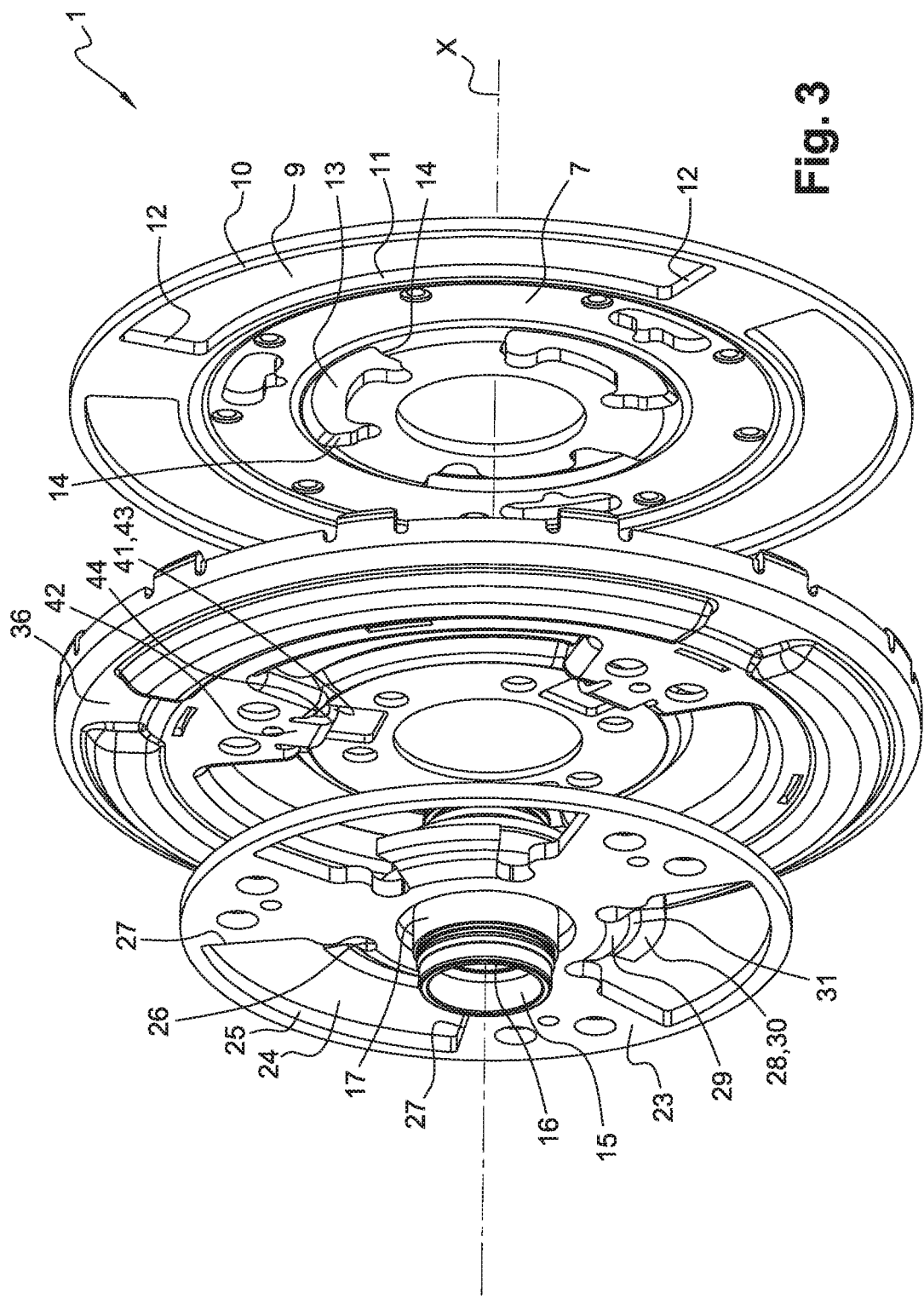
Figure 4:
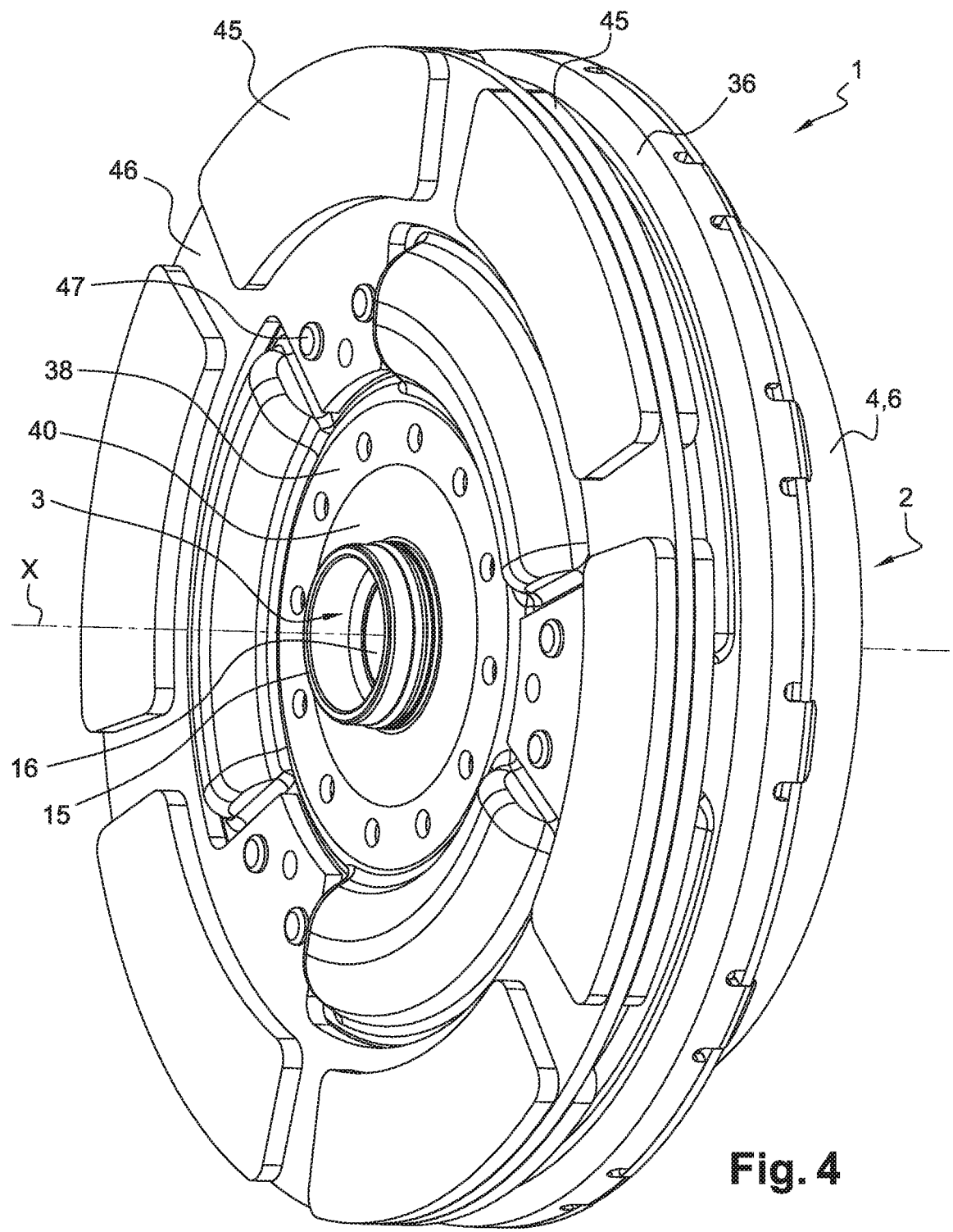
Figure 5:
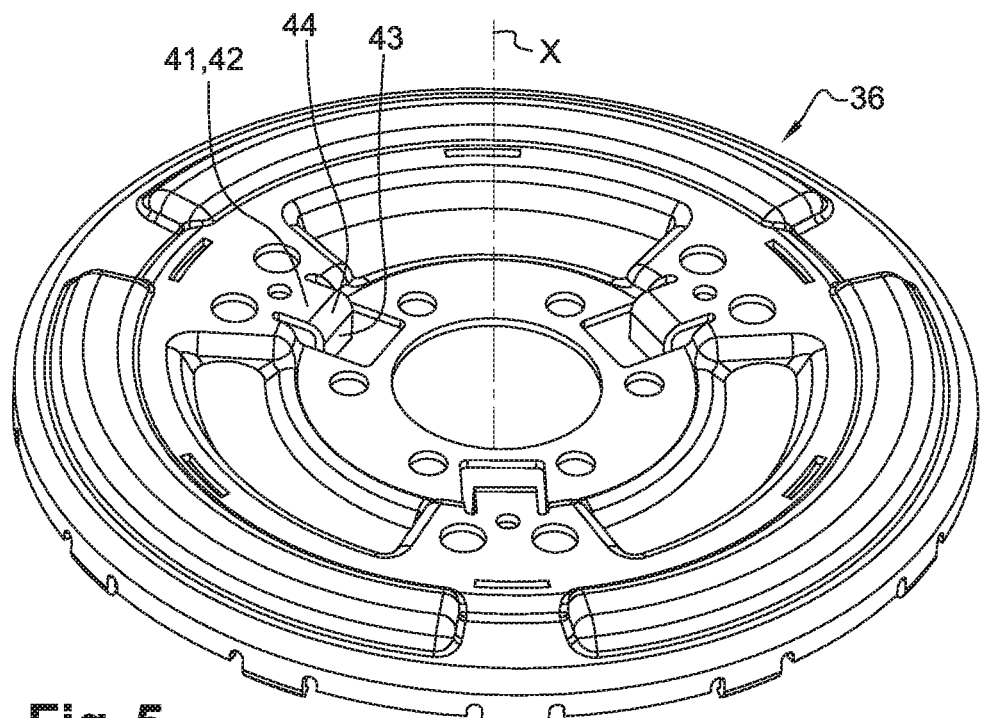
Figure 6:
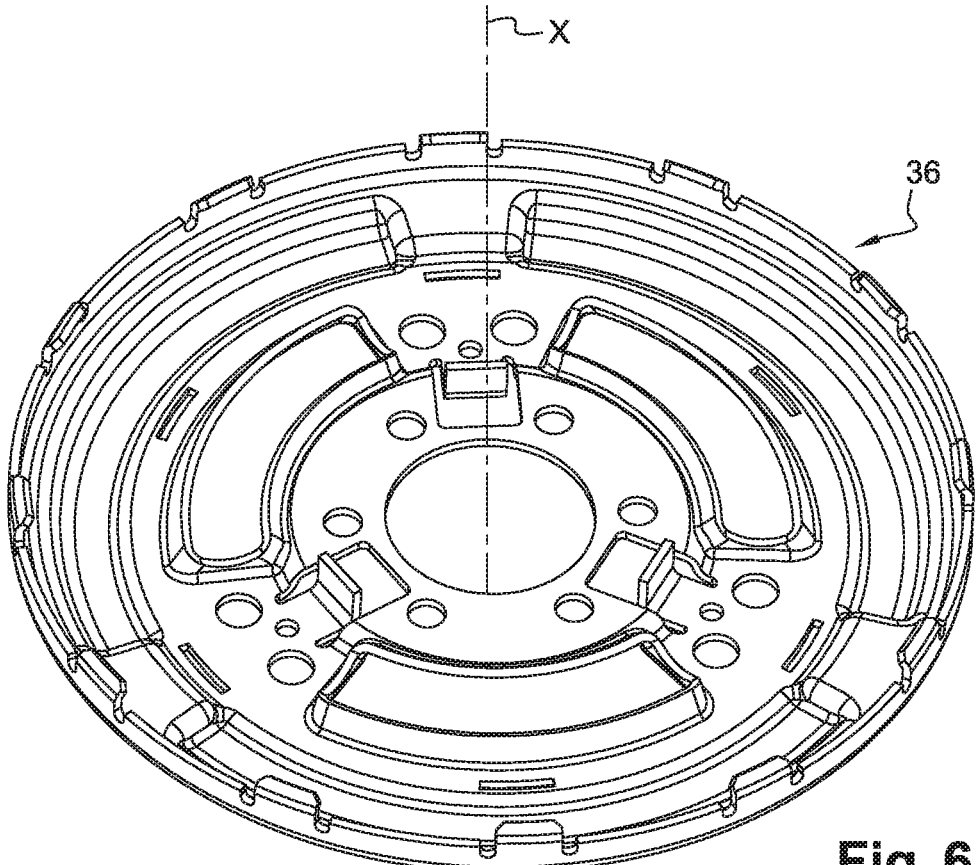

Input web 7 furthermore has oblong circular-arc openings 13 extending circumferentially, each opening 13 having two ends or lateral edges 14 extending radially (FIG. 3). Openings 13 are distributed evenly over the circumference and are situated radially inside windows 9.

Torque output element 3 has a hub 15 whose radially inner periphery 16 is splined so as to allow rotational coupling of hub 15 to an input shaft of a gearbox.

Figure 2:
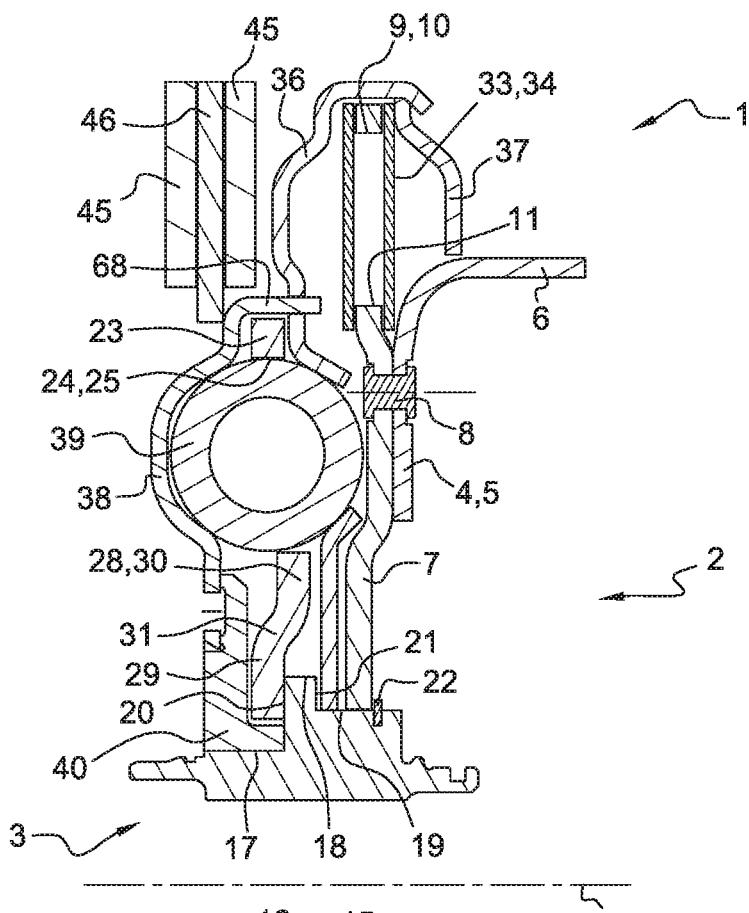
Figure 2:
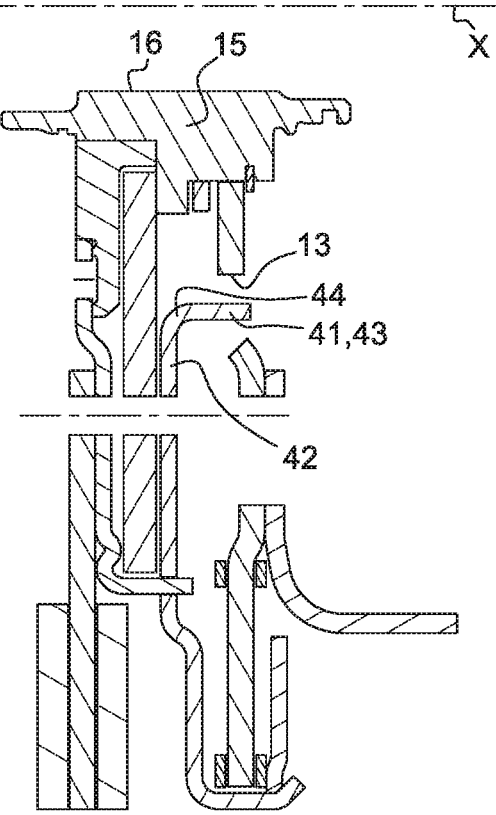

The radially outer periphery of hub 15 has in particular, from rear to front, i.e. from left to right in FIGS. 1 and 2, a first cylindrical portion 17, a second cylindrical portion 18, and a third cylindrical portion 19. The diameter of second cylindrical portion 18 is greater than the diameter of third cylindrical portion 19, which in turn is greater than the diameter of first cylindrical portion 17. First cylindrical portion 17 is connected to second cylindrical portion 18 by a first shoulder or by a first radial annular surface 20. Second cylindrical portion 18 is furthermore connected to third cylindrical portion 19 by a second shoulder or by a second radial annular surface 21. An elastic ring 22 is installed in an annular groove configured in a front portion of third cylindrical portion 19.

The radially inner periphery of input web 7 is installed pivotingly around third cylindrical portion 19 of hub 15, axially between second radial surface 21 and elastic ring 22.

Torque output element 3 furthermore has an annular output web 23, which extends radially and whose radially inner portion is fastened, for example by welding or riveting, to hub 15 at first radial surface 20 of hub 15.

Annular output web 23 has windows of circular-arc shape, for example three in number, distributed evenly over the circumference. Each window has a radially outer edge 25 and a radially inner edge 36 extending circumferentially, connected by lateral edges 27 extending radially (FIG. 3).

A stop tab 28 extends radially outward from inner edge 26 of each window 24. Each stop tab 28 has a radially inner portion 29 that forms the base of tab 28 and is connected to the remainder of output web 23, and a radially outer portion 30 that forms the free end of tab 28. Inner part 29 and outer part 30 of each stop tab 28 are offset axially from one another and are connected by an arched zone 31.

The damping means have first elastic members 32, in this case straight helical compression springs, installed pairwise in each of windows 9 of input web 7. In this embodiment, device 1 has three pairs of elastic members 32, elastic members 32 of a given pair being installed in series by means of a phasing member 33. Phasing member 33 has two annular plates or washers 34 extending radially, arranged axially on either side of the input web and fastened to one another. Each plate 34 has windows 35, the corresponding ends of elastic members 32 being capable of coming into abutment against the circumferential ends of said windows 35 of plates 34.

For each pair of elastic members 32, one of elastic members 32 is intended to abut at one end against input web 7 and at the other end against phasing member 33, the other elastic member 32 being intended to abut at one end against phasing member 33 and at the other end against guide washers 36, 37. Phasing member 33 is common to all the first elastic members 32, so that first elastic members 32 deform in phase with one another.

The damping means furthermore have second elastic members 39, in this case curved helical compression springs, for example three in number, each installed in a window 24 of output web 23. Each second elastic member 39 is intended to abut at one end against output web 23 and at the other end against guide washers 36, 38.

First elastic members 32 are situated radially outside of, and axially in front of, second elastic members 39.

Device 1 has in particular a central or common guide washer 36 on either side of which first and second lateral guide washers 37, 38 are fastened. Those guide washers define a guidance device arranged kinematically between the two damping stages 32 and 39.

First lateral guide washer 37 is situated in front of common guide washer 36, said guide washers 36, 37 being fastened to one another at their radially outer periphery, for example by riveting or by welding or hot crimping. Guide washers 36, 37 are situated axially on either side of first elastic members 32, and delimit between them an annular space in which first elastic members 32 are received.

Second lateral guide washer 38 is situated behind common guide washer 36. The radially outer periphery of second guide washer 38 is fastened to common guide washer 36 in a radially middle zone of said common guide washer 36, for example by hot crimping. This operation is possible by introducing tongues 68 of second guide washer 38 into slots 66 of common guide washer 36. For this, the width of slot 66 is greater than or equal to the thickness of the plate from which common guide washer 36 was cut out. That slot is therefore sufficiently wide for the introduction of tongue 68 of second guide washer 38.

Guide washers 36, 38 are situated axially on either side of second elastic members 39, and delimit between them an annular space in which second elastic members 39 are received.

The radially inner periphery of common guide washer 36 is installed pivotingly around third cylindrical portion 19 of hub 15, axially between second radial surface 21 and input web 7. The guidance device thus has a centering region P2 on output web 15.

The guidance device has an annular flange 40 fastened to the radially inner periphery of second lateral guide washer 38, said flange 40 being installed pivotingly around first cylindrical portion 17 of hub 15.

Flange 40 has a region P1 for centering the guidance device on output hub 15.

The guidance device thus has two centering regions and is thus particularly stable.

For installation, the guidance device can be installed by means of its two centering regions. Tongue 68 is then introduced into slot 66 with a slight clearance, that clearance being compensated for upon hot crimping of the two guide washers.

The common guide washer 36 furthermore has tabs 41, for example three in number, distributed evenly over the circumference. As is more apparent from FIGS. 5 and 6, each tab 41 has a portion 42, called the "base," extending radially and connected to the remainder of the common guide washer 36; and a portion 43, called the "free end," extending axially forward. The base 42 and the free end 43 of each tab 41 are connected to one another by a curved zone 44.

Free ends 43 of tabs 41 are engaged into openings 13 of input web 7 in such a way that, upon pivoting of input web 7 and of hub 4 with respect to guide washers 36, 37, 38, free ends 43 of tabs 41 are capable of coming into abutment against circumferential ends 14 of openings 13 so as to form stops that limit such angular deflection.

The angular deflection of input web 7 with respect to common guide washer 36 is between 15 and 45°, for example on the order of 30°.

In addition, each curved zone 44 is inserted circumferentially between stop tabs 28 of output web 23, more specifically between radially outer portions 30 of stop tabs 28, in such a way that upon pivoting of output web 23 and of hub 15 with respect to guide washers 36, 37, 38, portions 30 of stop tabs 28 are capable of coming into abutment against curved zones 44 of tabs 41 of common guide washer 36.

Tabs 41 thus act as stop members both with input web 7 and with output web 23.

The torque transmission device 1 furthermore includes a pendulum vibration damper having pendulum masses 45 installed movably at the radially outer periphery of an annular support 46. More specifically, pendulum masses 45 can be installed movably on support 46 by means of rollers and/or spacers (not depicted) as is known per se, those pendulum masses 45 being intended to improve the filtering of vibrations and rotational irregularities.

The radially inner periphery of support 46 is fastened to guide washers 36, 37, 38, for example to second lateral guide washer 38. This fastening is accomplished by riveting 47 (FIG. 4) or by welding, for example. The guidance device, which possesses two axially offset centering regions P1 and P2, advantageously imparts stability.

In addition, second cylindrical region 18 of output hub 15 forms a radial extension arranged axially between the two centering regions P1 and P2, so that that radial extension is capable of retaining the two centering regions P1 and P2 axially in both directions. The guidance device and output hub 15 can thus be held axially with respect to one another even in the context of a large axial load.

The assemblage formed by guide washers 36, 37, 38 and by support 46 thus forms an integral assemblage having considerable inertia, which allows a further improvement in the filtering performance that is achieved. The total inertia of this assemblage at rotation axis X is, for example, between 0.005 kg·m$^2$ and 0.05 kg·m$^2$, for example 0.03 kg·m$^2$.

Figure 7:
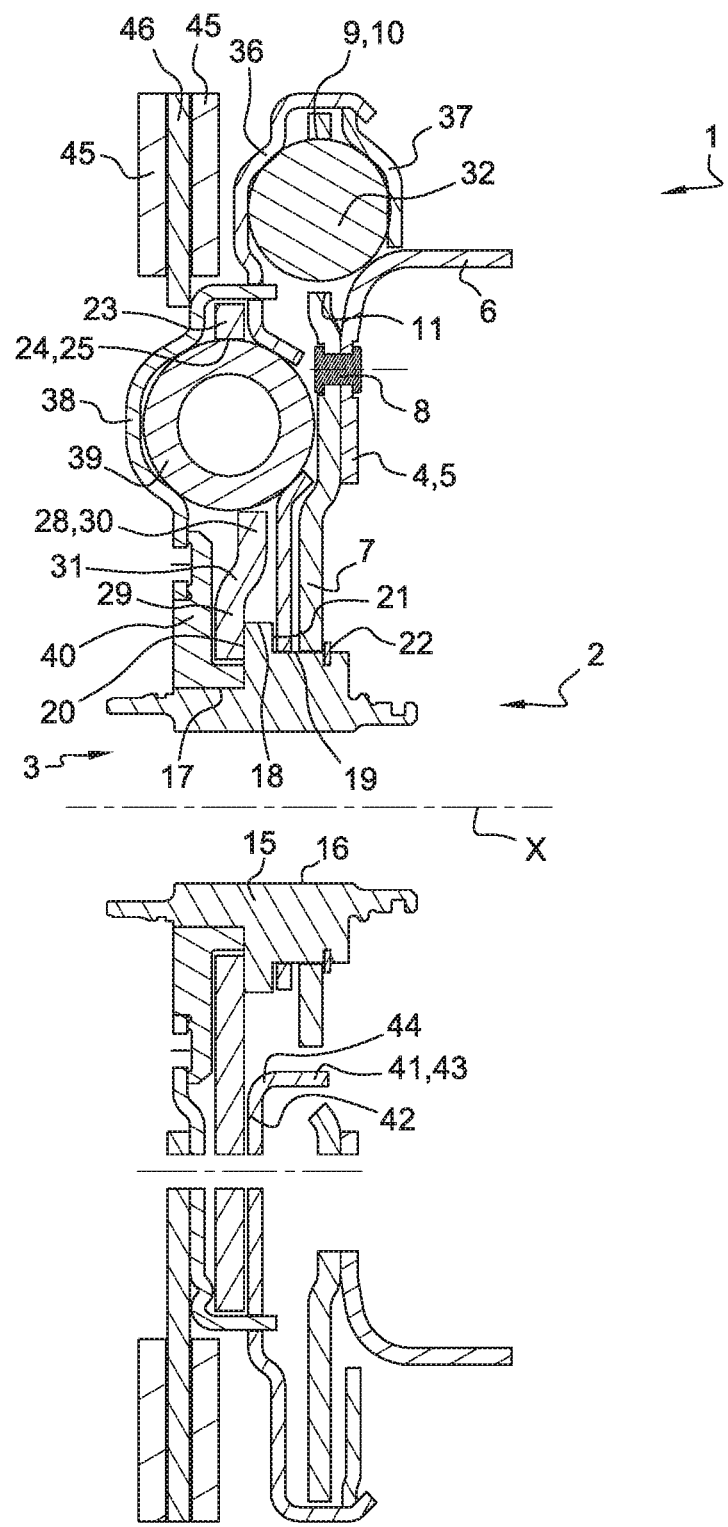
FIGS. 7 to 9 illustrate a torque transmission device according to a second embodiment of the invention; specifically.
Figure 8:
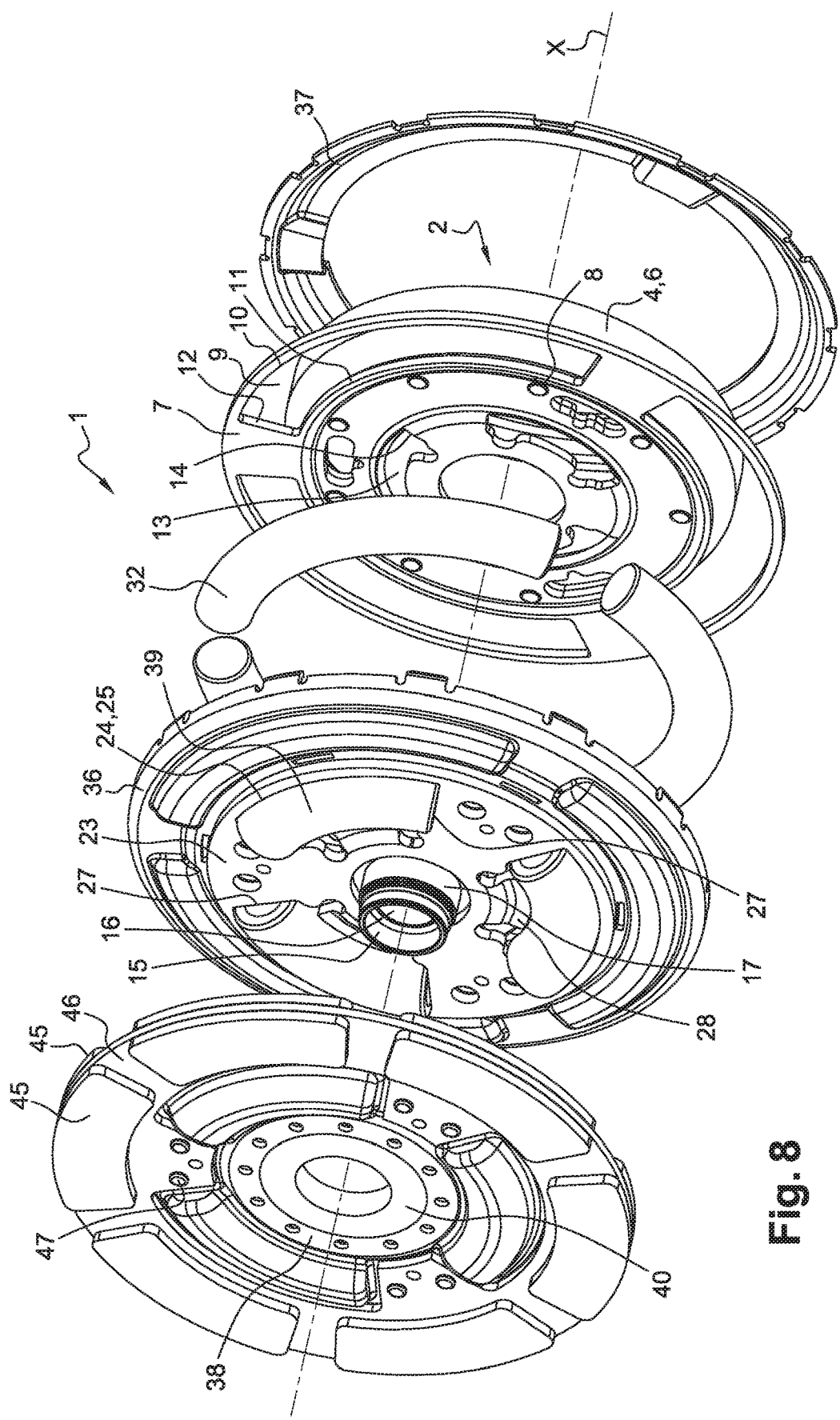
Figure 9:
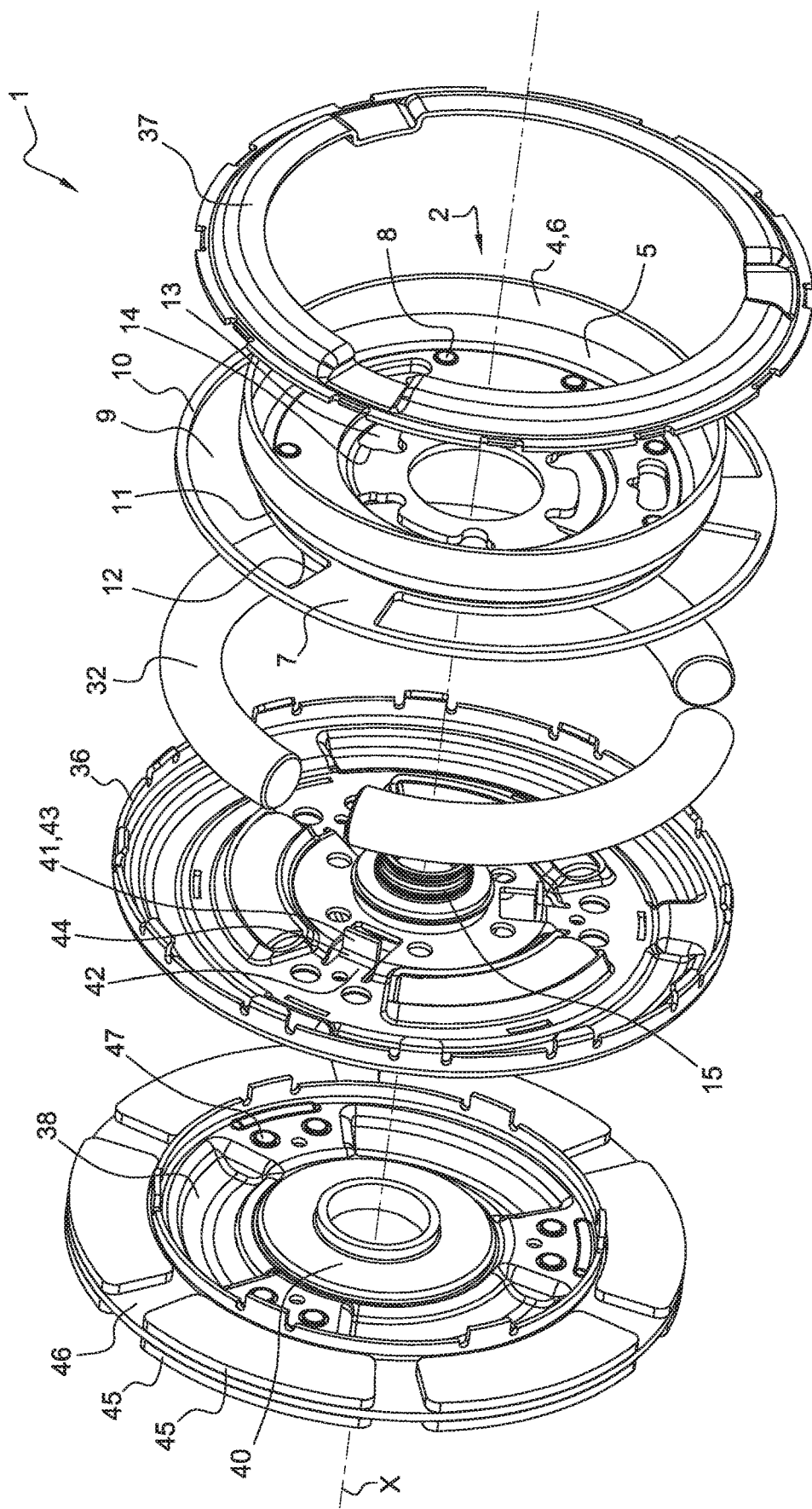

FIGS. 7 to 9 illustrate a torque transmission device 1 according to a second variant embodiment of the invention, which differs from the embodiment described with reference to FIGS. 1 to 6 in that device 1 has no phasing member 33 between input web 7 and guide washers 36, 37, 38. Device 1 thus has first elastic members 32, for example three in number, which each abut against input web 7 at one end and against guide washers 36, 37 at another end. First elastic members 32 are, for example, curved helical compression springs. First elastic members 32 are, as before, installed in windows 9 of input web 7.

Figure 10:
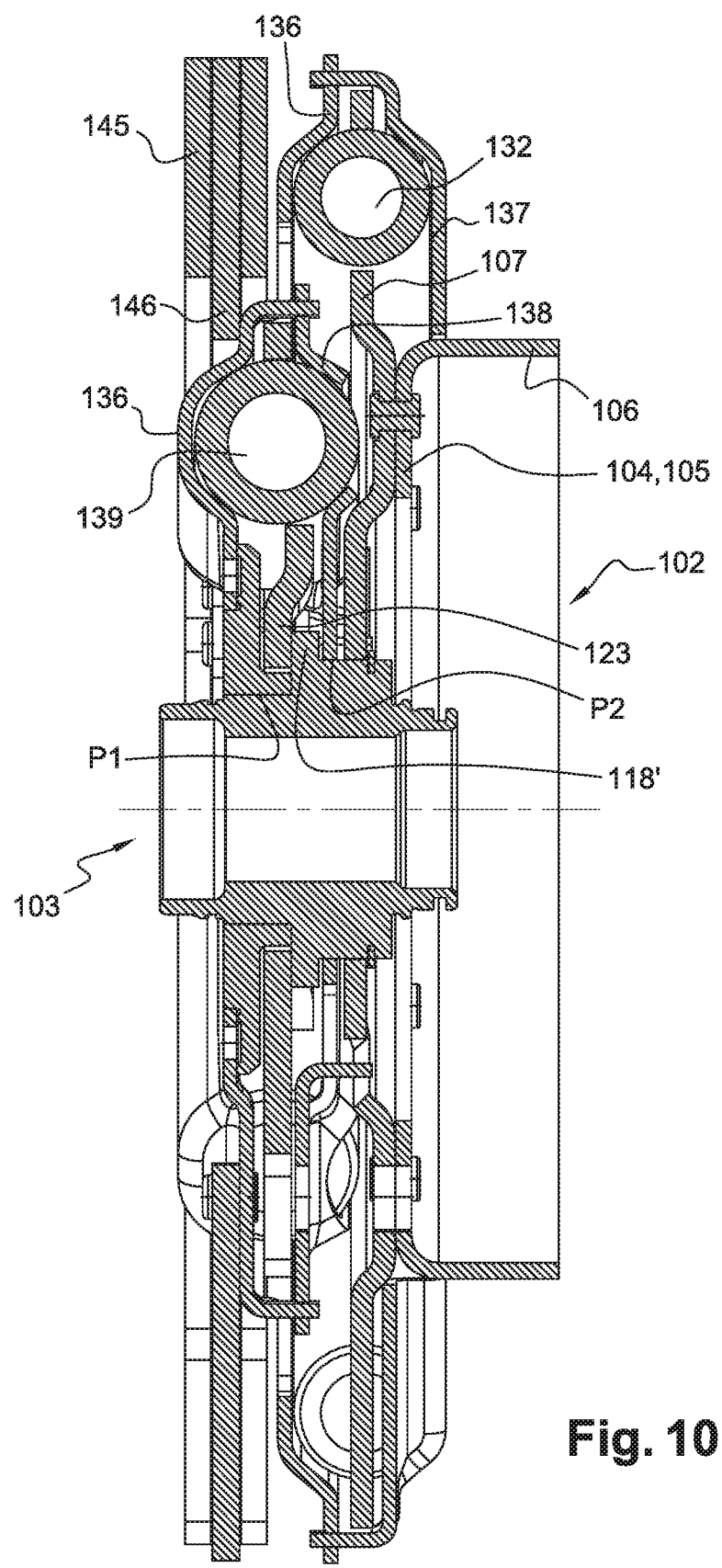
FIG. 10 is a section view of a torque transmission device according to another embodiment of the invention.

FIG. 10 illustrates another embodiment of the invention in which the guidance device is different. The input and output elements, in contrast, can be analogous to those described previously, illustrated in particular in FIGS. 1 to 6. The elastic member of first damping stage 132 and the elastic member of second damping stage 139 are situated axially on the same side of the guide washer that is common to the two stages, the elastic member of first damping stage 132 being installed between torque input element 102 and common guide washer 136, and the elastic member of second damping stage 139 being installed between common guide washer 136 and torque output element 103.

Common guide washer 136 is part of a guidance device that has first and second additional guide washers 137 and 138, fastened to common guide washer 136 and situated axially on the same side of common guide washer 136, the elastic member of first damping stage 132 being situated axially between common guide washer 136 and first additional guide washer 137, the elastic member of second damping stage 139 being situated axially between common guide washer 136 and second additional guide washer 138.

The elastic member of first damping stage 132 is capable of abutting against first additional guide washer 137 and against common guide washer 136 in order to transmit a torque between torque input element 2 and the guidance device, and the elastic member of second damping stage 139 is capable of abutting against second additional guide washer 138 and against common guide washer 136 in order to transmit a torque between the guidance device and torque output element 103.

Torque input element 102 has an input web 107 situated axially between common guide washer 136 and first additional guide washer 137.

Torque output element 103 has an output web 123 situated axially between common guide washer 136 and second lateral guide washer 138.

According to this embodiment the first and second stop means are carried by second additional guide washer 138.

The guidance device can have at least one stop member forming both the first stop means and the second stop means. This stop member is arranged on second additional guide washer 138 in a manner analogous to the first embodiment, i.e. in the case in which the stop member is arranged on the common guide washer.

The characteristics relative to stop member 41 of the first embodiment, considered alone or in combination, and the characteristics relative to the complementary abutments at stop member arranged on input web 107 and against output web 123, can be applied to this embodiment.

The device can have pendulum damping means 145 comprising pendulum masses installed movably on the guidance device and/or on a support 146 fastened to the guidance device.

Pendulum masses 145 can be installed movably on common guide washer 136, for example via a support 146.

According to another embodiment that is not depicted, the guidance device illustrated in FIG. 10 can be associated with a first damping stage having elastic members, for example straight helical compression springs, installed pairwise in windows of input web 107, the elastic members of each pair being installed in series by means of a phasing member, as was illustrated in FIGS. 1 to 5.

The invention claimed is:

1. A torque transmission device (1) for a motor vehicle, comprising:
   a torque input element (2) intended to be coupled to a driving shaft;
   a torque output element (3) intended to be coupled to an input shaft of a gearbox, the torque output element (3) and the torque input element (2) being capable of pivoting with respect to one another around an axis X; and
   first and second elastic damping stages (32, 39) installed in series between the torque input element (2) and torque output element (3),
   the first damping stage (32) having at least two elastic members arranged in series by a phasing member (33) and installed between the torque input element (2) and a guidance device (36; 37; 38; 40) so as to act against the rotation of the guidance device with respect to the torque input element (2),
   the second damping stage (39) having at least one elastic member installed between the guidance device (36; 37; 38; 40) and the torque output element (3) so as to act against the rotation of the torque output element with respect to the guidance device (36; 37; 38; 40),
   the guidance device (36; 37; 38; 40) having first stop means (43) capable of limiting the pivoting of the torque input element (2) with respect to the guidance device, and second stop means (42) capable of limiting the pivoting of the torque output element (3) with respect to the guidance device.

2. The device (1) according to claim 1, wherein the guidance device has a common guide washer (36) common to the two damping stages, wherein the at least two elastic members of the first damping stage (32) are installed between the torque input element (2) and the common guide washer (36), and wherein the elastic member of the second damping stage (39) is installed between the common guide washer (36) and the torque output element (3).

3. The device (1) according to claim 2, wherein the at least two elastic members (32) of the first damping stage and the elastic member (39) of the second damping stage are situated axially on either side of the common guide washer (36).

4. The device (1) according to claim 2, further comprising first and second lateral guide washers (37, 38) fastened to the common guide washer (36) and situated axially on either side of the common guide washer (36), wherein the at least two elastic members (32) of the first damping stage are situated axially between the common guide washer (36) and the first lateral guide washer (37), and wherein the elastic member (39) of the second damping stage is situated axially between the common guide washer (36) and the second lateral guide washer (38).

5. The device (1) according to claim 4, wherein the angular deflection of the torque input element (2) with respect to the guidance device (36; 37; 38; 40) and/or the angular deflection of the torque output element (3) with respect to the guidance device (36; 37; 38; 40) is between 15 and 45°.

6. The device (1) according to claim 5, wherein the guidance device has at least one stop member (41) forming both the first stop means (43) and the second stop means (42).

7. The device (1) according to claim 4, wherein the guidance device has at least one stop member (41) forming both the first stop means (43) and the second stop means (42).

8. The device (1) according to claim 2, wherein the guidance device has at least one stop member (41) forming both the first stop means (43) and the second stop means (42).

9. The device (1) according to claim 1, wherein the guidance device has at least one stop member (41) forming both the first stop means (43) and the second stop means (42).

10. The device (1) according to claim 9, wherein the at least one stop member is formed on the common guide washer (36).

11. The device (1) according to claim 10, wherein the stop member is formed by a tab (41), the torque input element (2) and the torque output element (3) being capable of abutting in two zones (43, 44) of the tab (41) which are offset from one another.

12. The device (1) according to claim 9, wherein the at least one stop member is formed by a tab (41), and wherein the torque input element (2) and the torque output element (3) are capable of abutting in two zones (43, 44) of the tab (41) which are offset from one another.

13. The device (1) according to claim 1, wherein the at least two elastic members (32) of the first damping stage are offset axially and radially from the elastic member (39) of the second damping stage.

14. The device (1) according to claim 13, wherein the at least two elastic members (32) of the first damping stage are situated radially externally with respect to the elastic member (39) of the second damping stage.

15. A torque transmission device (1) for a motor vehicle, comprising:
   a torque input element (2) intended to be coupled to a driving shaft;
   a torque output element (3) intended to be coupled to an input shaft of a gearbox, the torque output element (3) and the torque input element (2) capable of pivoting with respect to one another around an axis X;
   a pendulum vibration damper; and
   first and second elastic damping stages (32, 39) installed in series between the torque input element (2) and torque output element (3),
   the first damping stage (32) having at least one elastic member installed between the torque input element (2) and a guidance device (36; 37; 38; 40) so as to act against the rotation of the guidance device with respect to the torque input element (2),
   the second damping stage (39) having at least one elastic member installed between the guidance device (36; 37; 38; 40) and the torque output element (3) so as to act against the rotation of the torque output element with respect to the guidance device (36; 37; 38; 40),
   the guidance device (36; 37; 38; 40) having first stop means (43) capable of limiting the pivoting of the torque input element (2) with respect to the guidance device, and second stop means (42) capable of limiting the pivoting of the torque output element (3) with respect to the guidance device,
   the pendulum vibration damper comprising pendulum masses (45) installed movably on the guidance device and/or on a support (46) fastened to the guidance device.

16. The device (1) according to claim 15, further comprising first and second lateral guide washers (37, 38) fastened to the common guide washer (36) and situated axially on either side of the common guide washer (36), wherein the pendulum masses (45) are installed movably on a support (46) fastened to the second lateral guide washer (38).

17. The device (1) according to claim 15, wherein the pendulum masses (45) are installed movably on a support (46) fastened to the common guidance washer (36).

18. A torque transmission device (1) for a motor vehicle, comprising:
- a torque input element (2) intended to be coupled to a driving shaft;
- a torque output element (3) intended to be coupled to an input shaft of a gearbox, the torque output element (3) and the torque input element (2) being capable of pivoting with respect to one another around an axis X; and
- first and second elastic damping stages (32, 39) installed in series between the torque input element (2) and torque output element (3);
- the first damping stage (32) having at least one elastic member installed between the torque input element (2) and a guidance device (36; 37; 38; 40) so as to act against the rotation of the guidance device with respect to the torque input element (2);
- the second damping stage (39) having at least one elastic member installed between the guidance device (36; 37; 38; 40) and the torque output element (3) so as to act against the rotation of the torque output element with respect to the guidance device (36; 37; 38; 40);
- the guidance device (36; 37; 38; 40) having first stop means (43) capable of limiting the pivoting of the torque input element (2) with respect to the guidance device, and second stop means (42) capable of limiting the pivoting of the torque output element (3) with respect to the guidance device;
- the guidance device having a common guide washer (36) common to the two damping stages;
- the elastic member of the first damping stage (32) being installed between the torque input element (2) and the common guide washer (36);
- the elastic member of the second damping stage (39) being installed between the common guide washer (36) and the torque output element (3);
- the elastic member (32) of the first damping stage and the elastic member (39) of the second damping stage situated axially on either side of the common guide washer (36);
- the guidance device having at least one stop member (41) forming both the first stop means (43) and the second stop means (42).

* * * * *